Patented June 15, 1943

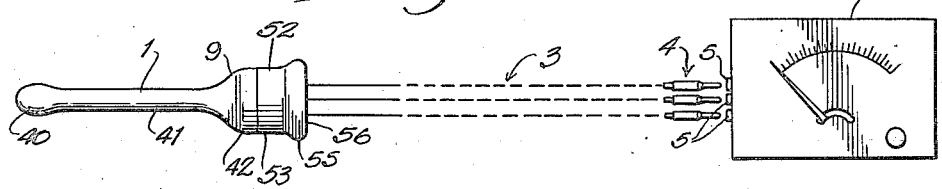
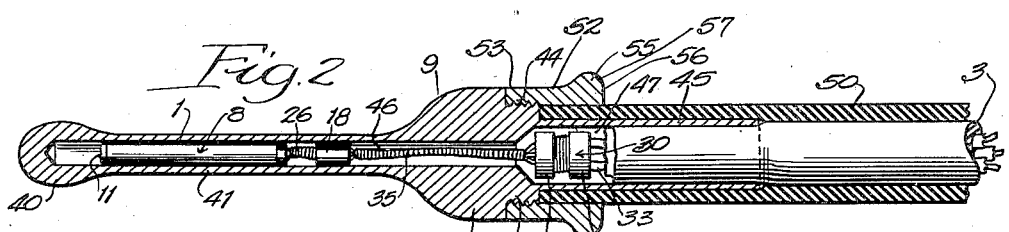
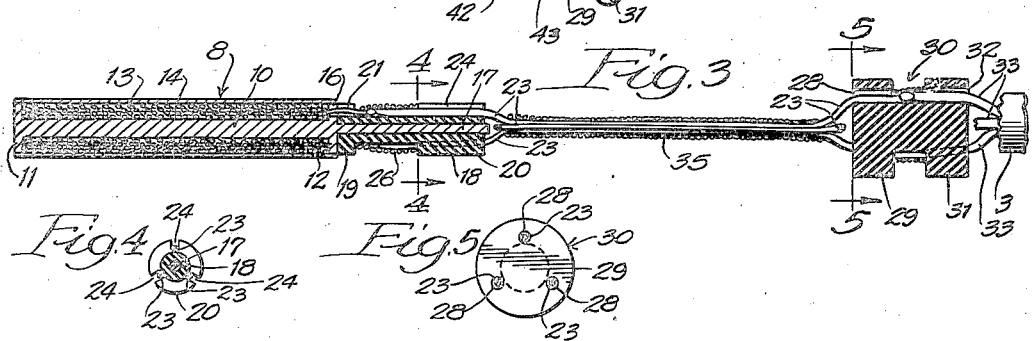
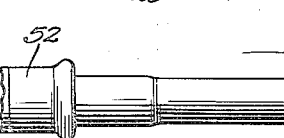
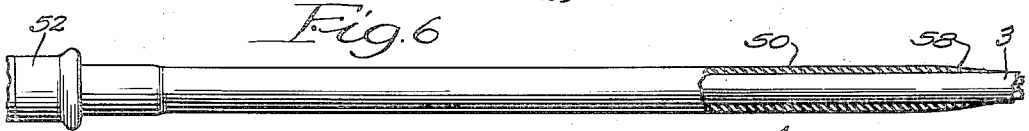
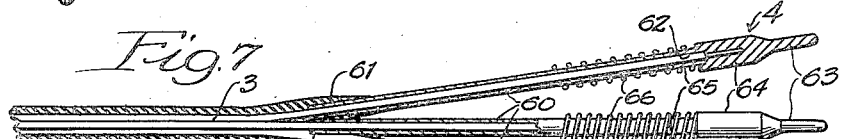
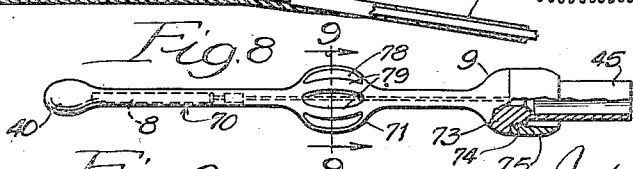
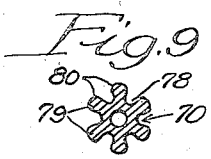

2,321,846

UNITED STATES PATENT OFFICE 2,321,846

TEMPERATURE RESPONSIVE DEVICE

John A. Obermaier, Chicago, Ill.

Application April 26, 1939, Serial No. 270,133

3 Claims. (Cl. 73—362)

This invention relates to thermometers and more particularly to electric thermometers that are especially adapted for accurate temperature measurements of parts within the human body. In its more particular aspects the invention is concerned with a construction of a rectal applicator for use with an indicating instrument as a thermometer.

In deep body therapy, such a diathermy or radiothermy, or any other treatment of pathological conditions where it is necessary to raise the temperature of the body, it is frequently essential or desirable to note, accurately, the temperature of tissues located deep within the body, as, for instance, within the bowel. A temperature measuring device to be inserted into the human body for measuring the temperature at such places must necessarily be exceedingly small yet in such instances it is essential that the temperature rise at one local spot may be accurately ascertained.

In accordance with the teachings of the present invention the temperature of tissues within the bowel is measured by measuring the change in resistance of a very small thermal responsive element or resistance within an applicator that is inserted into the bowel. An electric cable extends from the applicator to a meter which may be in the form of a Wheatstone bridge the galvanometer of which is calibrated in terms of temperature. The applicator is left in the bowel during treatment, and temperature readings are made at time intervals. The construction of the applicator must be such that it will not be expelled by the ordinary muscular action. To accomplish this result the rectal applicator has been provided with an enlarged portion spaced from the front of the applicator and so constructed as to inhibit any expulsion movement of the applicator by muscular action, while at the same time not interfering with insertion of the applicator in place. The enlarged portion may be at the end of the applicator remote from the thermal element, or it may be located intermediate the ends of the applicator.

In structures of this type it is essential that the exterior shall be smooth and free of any turns, corners or indentations such as might harbor foreign matter which might start deterioration of the apparatus. It is also essential that a perfect seal be obtained and maintained between the outer sheath of the cord or cable and the metallic applicator, and that this seal be such that it can be easily maintained in a clean and sterile condition. It is an object of the present invention to provide an improved means for sealing a cord or cable to the applicator in such a manner as will facilitate the cleaning thereof and which will prevent any possibility of leakage into the applicator.

It is a further object of the present invention to provide a sealing arrangement which includes a short rubber tube or the like that fits over the end of the cable in such a manner that any deteriorating action that takes place will be on this rubber sheath, which can then be discarded and replaced in a simple manner.

The attainment of the above and further objects of the present invention will be apparent from the following specification taken in conjunction with the accompanying drawing forming a part thereof.

In the drawing:

Figure 1 is a view illustrating the applicator and the circuit connections thereto to constitute a rectal thermometer;

Figure 2 is an enlarged longitudinal sectional view through the applicator and the adjacent connecting cord;

Figure 3 is an enlarged longitudinal sectional view through the thermal responsive element of the applicator and illustrating the electrical connections thereto;

Figure 4 is a sectional view taken along the line 4—4 of Figure 3;

Figure 5 is a sectional view taken along the line 5—5 of Figure 3;

Figure 6 is a view in partial section illustrating the end of the cable at the applicator;

Figure 7 is a longitudinal sectional view through the end of the cord that plugs into the meter of the thermometer;

Figure 8 is an elevational view of a modified construction; and

Figure 9 is a sectional view taken along the line 9—9 of Figure 8.

Reference may now be had more particularly to Figure 1. In this figure there is shown a rectal thermometer comprising a rectal applicator I and an indicating instrument 2 connected by a rubber sheathed three wire cord or cable 3 that is permanently connected at one end to the applicator and terminates at the other end in three plugs, indicated at 4, adapted to enter jacks 5 on the indicating instrument 2. While I have shown the connection between the applicator and the indicating instrument in the form of a three conductor cord, it is within the purview of the present invention to use a two wire circuit or a four wire circuit if desired. A two wire circuit is illustrated, by way of example, in Figure 8 of my Patent No. 2,131,065 issued September 27, 1938.

The applicator 1 consists of a thermal responsive element 8, within a casing 9, of Monel metal, or stainless steel, or other non-tarnishable metal, the element being sealed within the casing, and the end of the cord 3 being also sealed within the casing.

A description will now be given of the construction of the thermal responsive element 8 for which reference may be had more particularly to Figure 3. This element comprises a spool 10, of copper or the like, having end flanges 11 and 12 joined by a circular shank, around which a thermal responsive wire 13 is wound. The winding 13 consists of insulated fine thermal responsive wire wound on the spool 10 in a number of layers, in this instance four layers. The outside of the winding 13 is encased in a metal foil sleeve 14. The flange 12 of the spool has two slots 16 formed in the periphery thereof, through which the ends of the wire 13 extend. A cylindrical pin or projecting portion 17, integral with the spool 10, extends centrally from the flange 12. A short insulating spool 18 is slipped over the circular pin 17 and tightly embraces the same. This spool 18 has flanges 19 and 20 thereon separated from one another. The flange 19 has slots 21 therein opposite the slots 16 of the flange 12. Each end of the thermal resistance wire 13 extends through one of the two slots 21 into the space between the flanges 19 and 20. Three lead wires 23 extend through three slots 24 in the flange 20 to the space between the flanges 19 and 20. One of the three wires 23 is joined to one of the ends of the winding 13. The other two of the three lead wires 23 are joined together with the other end wire of the winding 13, the joints for the wires being located in the space between the flanges 19 and 20 of the spool 18. A wrapping of insulating silk thread, indicated at 26, is then wound over the connection in the space between the flanges 19 and 20. The wire of the thermal resistance coil 13 is very fine. The lead wires 23 are stranded wires of greater thickness so that the thermal resistance element and the insulating spool 18 can be and are supported by the lead wires 23. The opposite ends of the lead wires 23 extend through holes 28 in a flange 29 of a spool 30 of insulating material. Three holes 28 are provided, one for each of the three leads 23. The spool 30 has an opposite flange 31 similar to the flange 29, and having three holes 32 therein in line with the three holes 28. The ends of the three conductors in the three conductor cable 3 are separated from one another and are stripped of their insulation and extended through the three holes 32. Connections between the wires 33 and the wires 23 are made in the space between the flanges 29—31, and the electrical connections are covered by a wrapping of insulating thread 35 of silk or the like. This constitutes the thermal responsive element of the applicator.

The metal casing 9 of the applicator is circular in cross section throughout and comprises a bulbous front end portion 40, a thin stem portion 41 and an enlarged head portion 42 at the rear. The head is of reduced diameter at its rearmost end, as indicated at 43, the reduced diameter of the portion 43 having an external thread at 44, and terminating in a tubular sleeve 45 all constituting one piece of metal. The casing has a bore 46 therein for receiving the thermal responsive element and has an enlarged bore 47 in the sleeve 45 for receiving the end of the cable 3 and for receiving the spool 30 with the connections thereon.

A rubber sheath 50 fits snugly over the end of the three conductor cable 3. The end of the three conductor cable fits into the sleeve 45, and the sheath 50 fits tightly on the outside of the sleeve 45. A layer of rubber cement is interposed between the outer surface of the cable 3 and the interior of the sleeve 45 and another layer of rubber cement is interposed between the inner periphery of the sheath 50 and the outer surface of the sleeve 45. A ring or ferrule 52 of the same metal as the casing 9 fits around the outside of the sheath 50 and is threaded onto the head portion 42 at the threads 44. A layer of cement is interposed between the sheath 50 and the ferrule 52, and rubber cement is also interposed around the threads 44. The outer periphery 53 of the ferrule 52 is of exactly the same diameter as that of the adjacent head portion 42 so that the two constitute one continuous smooth surface. The ferrule 52 has an enlargement 55 at the end thereof merging with the surface 53 and with the end surface 56 along a smooth circular curve 57. The head 42 and the ferrule 52 are thus of a generally acorn shape, both highly polished to constitute a continuous smooth surface.

The rubber sheath 50 over the rubber cable 3 extends for a short distance, approximately seven or eight inches, although a greater or lesser length of rubber sheath 50 may be used, and is vulcanized to the outer rubber cover of the cable 3 at 58. The end of the sheath 50 tapers to merge with the rubber of the cable 3 along a smooth surface free of sharp turns. The sheath 50 is preferably made of pure gum rubber to withstand cleansing and sterilizing action without rapid deterioration.

In order to effect the proper functioning of the applicator for long periods of time it is essential that the interior of the applicator be moisture free at the time of manufacture, and be maintained moisture free. To effect this result the applicator is freed of substantially all moisture by heating the same before the cable 3 is cemented in place. The cable 3 with its outer cementitious coating is inserted into the sleeve 45 and the unit then baked to assure the expulsion of all moisture. Thereafter the sheath 50 is slipped over the sleeve 45, with a suitable layer of rubber cement between the sleeve 45 and the sheath, and the ferrule 52 secured in place with a proper cementitious layer between the ferrule and the sheath and between the ferrule and the head, and the unit again baked. This procedure results first, in permitting the escape of moisture from the unit, and second, in the proper sealing of the unit against the subsequent entry of moisture thereinto.

At the end of the cable 3 remote from the applicator the three insulated conductors thereof are separated. A tube of insulation 60 is slipped over each of the three wires and the ends of the insulation are vulcanized to the outer rubber cover of the cable 3 at 61. A plug 4 for a jack is secured to the end of each wire for the cable. Each plug is circular in cross section throughout and comprises a single piece of metal of high electrical conductivity having a central bore 62 in which the end of the cable conductor is soldered. Each plug has a circular tip portion 63, an enlarged intermediate circular portion 64 and a shank 65. The end of a coiled spring 66 very tightly embraces the shank 65 and extends beyond the same for a suitable distance, embracing the covering 60 on the wire. The spring thus protects the wire against kinking or breaking at the end. The inner end of the spring 66 makes a press fit with the shank 65 and is thus securely held in place.

In Figures 8 and 9 I have shown a rectal applicator of somewhat greater length than that of Figure 1 and embodying certain features absent therein. Insofar as this applicator is similar to that of Figure 1, similar reference numerals have been used and a further description thereof at this time is unnecessary. The applicator 70 of Figure 8 includes an enlarged bulbous protuberance 71 intermediate the ends thereof. The protuberance 71 is spaced from the front bulbous portion 40 a distance approximately equal to the distance of the head 9 from the bulbous portion 40 in Figure 2. The thermal resistance element 8 is located within the applicator 70 between the bulbous portion 40 and the enlarged bulbous protuberance 71, with the spool 18 terminating forward of the bulbous portion 71. The lead wires 23 connected to the thermal resistance element at the spool 18 are of appreciably greater length than the corresponding lead wires of Figure 3, so that the spool 30 which constitutes the connecting terminal between the leads 23 and the line wires 33 is located within the sleeve 45 in the same manner as in Figure 2. The rear end of this applicator has an enlarged head portion 73, threaded at 74 to receive a ferrule 75, which corresponds to the ferrule 52 of Figure 2, for sealing the end of the applicator. The outer surface of the ferrule 75 and of the adjacent enlarged portion 73 merge in smooth continuous curves without any sharp bends or kinks. The sheath 50 is cemented in place to the outer periphery of the sleeve 45 and to the inner periphery of the ferrule 75, as previously described, and the surfaces between the ferrule 75 and the adjacent enlarged portion 73 are also sealed by a cementitious seal.

The enlarged bulbous protuberance 71 has six longitudinally extending grooves 78 at the periphery thereof forming six radial projections 79. The projections 79 are smoothly curved, as indicated at 80, and free of all sharp corners.

When the applicator of Figure 8 is used it is inserted in place until the enlarged bulbous portion 71 just enters the rectum, leaving the portion 73 outside of the body. The enlarged bulbous portion 71 serves to hold the applicator in place against expulsion by muscular contraction. The slots or grooves 78 provide for venting. In such instances where this last function is not needed the grooves 78 may be omitted and the enlarged bulbous portion 71 may be of a smooth continuous curvature circular in cross section throughout.

The applicator may be quickly and thoroughly washed or cleansed by disinfectants without danger of the entry of moisture into the applicator, due to the improved seal construction. Moisture in an applicator of this type might so alter the resistance at the connection as to render the applicator practically useless. Also the connections between the lead wires and the thermal resistance element and the connections between the line wires and the lead wires are so constructed that the adjacent connections are exceedingly close together thus eliminating all possibility of the existence of a temperature difference between the connections at the spool 18 or between the connections at the spool 30. The avoidance of a temperature difference between adjacent connections involving two diffrent kinds of wires is of great importance because a temperature difference might and probably would result in the production of a thermocouple so that the resulting voltage thus generated would render the instrument reading erroneous.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. Apparatus comprising an electric element, a casing for said element, said casing having a sleeve constituting an integral part of the casing, a circuit extending cable extending into the casing through said sleeve and fitting snugly therein, an elastic sheath surrounding said sleeve and the adjacent end of the cable and making a sealing fit with the sleeve and the cable, a ferrule at the end of the casing and embracing the sheath, said ferrule making a liquid-tight seal with the casing and with the sheath.

2. A temperature responsive device including a thermal responsive electric element, a protective casing, in one end of which the element is located, said casing having a head portion at the other end thereof, said head portion having a sleeve, a multi-conductor line cable the wires of which extend into said sleeve for extending circuit connections to the element, an elastic water-proof sealing sheath surrounding the cable, the inner periphery of the sheath being cementitiously sealed to the outer periphery of the sleeve, a ferrule threaded on said head and embracing the outside of said sheath, and a cementitious seal between the ferrule and the sheath and between the ferrule and the head.

3. A temperature responsive device including a thermal responsive electric element, a protective casing in one end of which the element is located, said casing having a head portion at the other end thereof, said head portion having a sleeve, a multi-conductor line extending into said sleeve for extending circuit connections to the element, an elastic waterproof sealing sheath surrounding the line, a liquid-tight seal between the inner periphery of the sheath and the outer periphery of the sleeve and between the inner periphery of the sheath and the line, a ferrule at the end of said head and embracing the outside of said sheath, and a seal between the ferrule and the sheath.

JOHN A. OBERMAIER.